United States Patent
Cho (10) Patent No.: US 8,671,539 B2
(45) Date of Patent: Mar. 18, 2014

(54) METHOD OF MANUFACTURING MASTER LINK

(75) Inventor: Hang Lae Cho, Jinju (KR)

(73) Assignee: Korea Crawler Track Ltd., Jinju-Si (KR)

( * ) Notice: Subject to any disclaimer, the term of this patent is extended or adjusted under 35 U.S.C. 154(b) by 0 days.

(21) Appl. No.: 13/547,231

(22) Filed: Jul. 12, 2012

(65) Prior Publication Data

US 2013/0152361 A1    Jun. 20, 2013

(30) Foreign Application Priority Data

Dec. 16, 2011    (KR) .................. 10-2011-0136386

(51) Int. Cl.
*B23P 17/00*    (2006.01)

(52) U.S. Cl.
USPC ............................................................. 29/417

(58) Field of Classification Search
USPC .................. 29/434, 428, 411, 412, 415, 417;
219/69.12, 69.17; 305/202–204;
72/405.16; 198/774.1; 59/7
See application file for complete search history.

(56) References Cited

U.S. PATENT DOCUMENTS 8,420,972 B2 *    4/2013    Cho .......................... 219/69.12

FOREIGN PATENT DOCUMENTS

| JP | 06-071518 | 3/1994 |
|---|---|---|
| KR | 20-0441810 | 9/2008 |
| KR | 101022835 | 3/2011 |

* cited by examiner

*Primary Examiner* — John C Hong (74) *Attorney, Agent, or Firm* — Lexyoume IP Meister, PLLC (57) ABSTRACT

Disclosed herein is a method of manufacturing a master link which connects ends of track chains of an endless track to each other. More particularly, the present invention relates to a method of manufacturing a master link which includes a pair of partial link units that are separably coupled to each other, and which can markedly enhance the degree of precision in machining the partial link units and the quality of the product. The method includes forming a wire-cutting reference hole at a predetermined position in the master link so that a wire is inserted into the wire-cutting reference hole, and forming the first and second partial link units by wire-cutting after inserting the wire into the wire-cutting reference hole.

4 Claims, 7 Drawing Sheets

METHOD OF MANUFACTURING MASTER LINK

BACKGROUND OF THE INVENTION

1. Field of the Invention

The present invention relates generally to master links which connect ends of track chains of endless tracks to each other and, more particularly, to a method of manufacturing a master link which includes a pair of partial link units that are separably coupled to each other, and which can markedly enhance the degree of precision in machining the partial link units and the quality of the product.

2. Description of the Related Art

Endless tracks are used in crawler type vehicles, such as bulldozers or excavators. Such an endless track includes a plurality of track chain links which are rotatably connected one after another. A track shoe is provided on each track chain link. Ends of the track chain links are removably connected to each other by master links.

Such a master link for an endless track is an element which connects corresponding ends of the track chain links to each other. The master link includes two partial link units which are fitted to each other. Each partial link unit has an assembly portion. Assembling the two partial link units includes engaging their assembly portions with each other and fastening the partial link units to each other using a coupler.

The master link is manufactured by heating material, hot forging, heat treatment, planning both sides, boring holes for pins and bushings, drilling coupling portions, high-frequency treatment of portions to be worn by friction, a primary cutting operation for forming partial link units, a secondary cutting operation for machining the partial link units, and tapping the coupling portions.

Particularly, given characteristics of the assembly portions of the partial link units of the master link, the partial link units are formed by conducting the primary cutting operation using wire-cutting and the secondary cutting operation for forming a gap between the assembly portions.

However, in the conventional master link manufacturing method, only wire-cutting is used when dividing the master link into the two partial link units and forming the assembly portions of the partial link units. Therefore, process speed is comparatively low and cutting error is increased, thus reducing the degree of precision and the quality of the product.

SUMMARY OF THE INVENTION

Accordingly, the present invention has been made keeping in mind the above problems occurring in the prior art, and an object of the present invention is to provide a method of manufacturing a master link which can reduce a cutting error of assembly portions of partial link units, thus enhancing the degree of precision and the quality of the product.

In order to accomplish the above object, the present invention provides a method of manufacturing a master link divided into a first partial link unit having a first assembly portion and a second partial link unit having a second assembly portion, the method including: forming a wire-cutting reference hole at a predetermined position in the master link so that a wire is inserted into the wire-cutting reference hole; and forming the first and second partial link units by wire-cutting after inserting the wire into the wire-cutting reference hole.

The forming of the wire-cutting reference hole may include forming the wire-cutting reference hole at a predetermined position between the first and second partial link units, wherein the wire-cutting reference hole is formed by a super drilling process.

The forming of the first and second partial link units may include: forming inside contours of the first and second assembly portions based on the wire-cutting reference hole; and forming outside contours of the first and second assembly portions.

Each of the first and second assembly portions may include a teeth-shaped portion, a front inclined surface formed ahead of the teeth-shaped portion, the front inclined surface being inclined at a predetermined angle, a rear inclined surface formed behind the teeth-shaped portion, the rear inclined surface being inclined at a predetermined angle, and a vertical portion extending upwards from the rear inclined surface. The forming of the inside contours may include forming the teeth-shaped portions of the first and second assembly portions based on the wire-cutting reference hole by wire-cutting. The forming of the outside contours may include forming the vertical portions, the rear inclined surfaces and the front inclined surfaces of the first and second assembly portions.

The forming of the inside contours may include forming the front inclined connection portions, the teeth-shaped portions, the rear inclined connection portions of the first and second assembly portions. The forming of the outside contours may include: forming the vertical portions of the first and second assembly portions by wire-cutting and then forming the rear inclined surfaces such that lower ends of the vertical portions are connected to the respective rear inclined connections of the teeth-shaped portions; and forming the front inclined surfaces by wire-cutting such that the front inclined surfaces are connected to the respective front inclined connection portions of the teeth-shaped portions.

In the present invention, after a wire-cutting reference hole is formed at a predetermined position in the master link, the wire-cutting is conducted based on the wire-cutting reference hole such that an operation of forming the inside contour of the master link precedes an outside contour forming operation. Thereby, a cutting error in forming the assembly portions of partial link units can be markedly reduced, thus enhancing the degree of precision and the quality of the product.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 1:
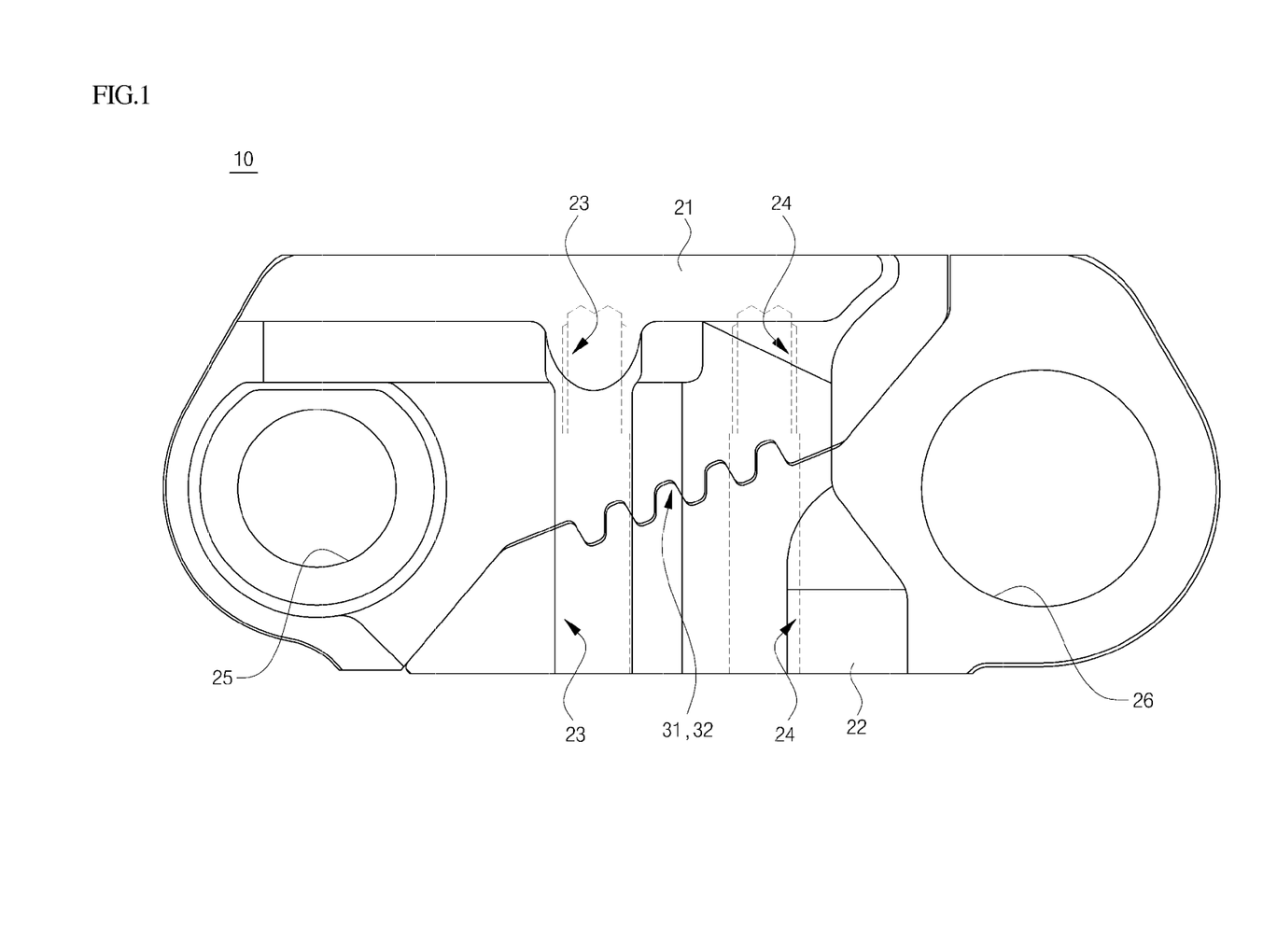
FIG. 1 is a plan view showing a master link of an endless track, according to the present invention.
Figure 2:
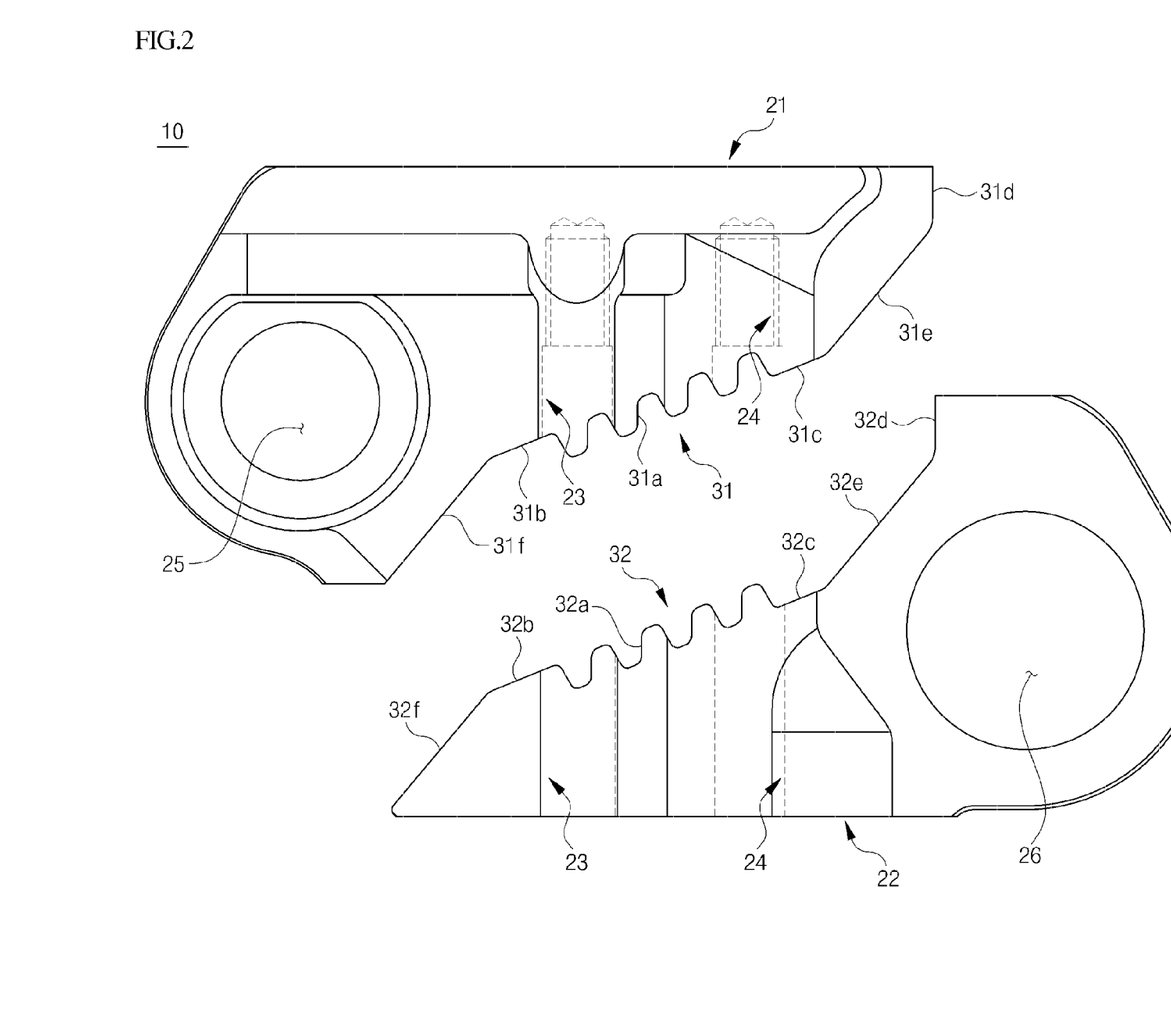
FIG. 2 is a plan view showing partial link units of the master link that are separated from each other.

FIGS. 1 and 2 are views illustrating a master link which connects ends of a track chain links of an endless track to each other.

As shown in the drawings, the master link 10 includes first and second partial link units 21 and 22. In other words, the first partial link unit 21 and the second partial link unit 22 are separably coupled to each other, thus forming the master link 10. A first assembly portion 31 of the first partial link unit 21 and a second assembly portion 32 of the second partial link unit 22 engage with each other and are coupled to each other by couplers or the like.

Pin bores 25 and 26, into which pins are coupled, are respectively formed in ends of the first and second partial link units 21 and 22. Coupling holes 23 and 24 are formed in each of the first and second partial link units 21 and 22. The coupling holes 23 and 24 of the first partial link unit 21 respectively communicate with the coupling holes 23 and 24 of the first partial link unit 22. The couplers are inserted into the corresponding coupling holes 23 and 24 so that the first and second partial link units 21 and 22 are coupled to each other.

The first assembly portion 31 is formed in a lower surface of the first partial link unit 21. The second assembly portion 32 is formed in an upper surface of the second partial link unit 22.

The first assembly portion 31 includes a teeth-shaped portion 31a, a front inclined surface 31f which is formed ahead of the teeth-shaped portion 31a and inclined at a predetermined angle, a rear inclined surface 31e which is formed behind the teeth-shaped portion 31a and inclined at a predetermined angle, and a vertical portion 31d which vertically extends upwards from the rear inclined surface 31e. A front inclined connection portion 31b which is inclined at a predetermined angle connects a front end of the teeth-shaped portion 31a to the front inclined surface 31f. A rear inclined connection portion 31c which is inclined at a predetermined angle connects a rear end of the teeth-shaped portion 31a to the rear inclined surface 31e. The angle of inclination is different for each of the front inclined surface 31f, the rear inclined surface 31e, the front inclined connection portion 31b and the rear inclined connection portion 31c.

The second assembly portion 32 includes a teeth-shaped portion 32a, a front inclined surface 32f which is formed ahead of the teeth-shaped portion 32a and inclined at a predetermined angle, a rear inclined surface 32e which is formed behind the teeth-shaped portion 32a and inclined at a predetermined angle, and a vertical portion 32d which vertically extends upwards from the rear inclined surface 32e. A front inclined connection portion 32b which is inclined at a predetermined angle connects a front end of the teeth-shaped portion 32a to the front inclined surface 32f. A rear inclined connection portion 32c which is inclined at a predetermined angle connects a rear end of the teeth-shaped portion 32a to the rear inclined surface 32e. The angle of inclination is different for each of the front inclined surface 32f, the rear inclined surface 32e, the front inclined connection portion 32b and the rear inclined connection portion 32c.

When the first assembly portion 31 of the first partial link unit 21 engages with the second assembly portion 32 of the second partial link unit 22, partial gaps are formed between the first and second assembly portions 31 and 32. Such partial gaps make it easy to assemble the first and second assembly portions 31 and 32 and make it possible to reliably maintain the assembled state.

FIGS. 3 through 7 are views illustrating a method of manufacturing a master link according to an embodiment of the present invention.

Figure 7:
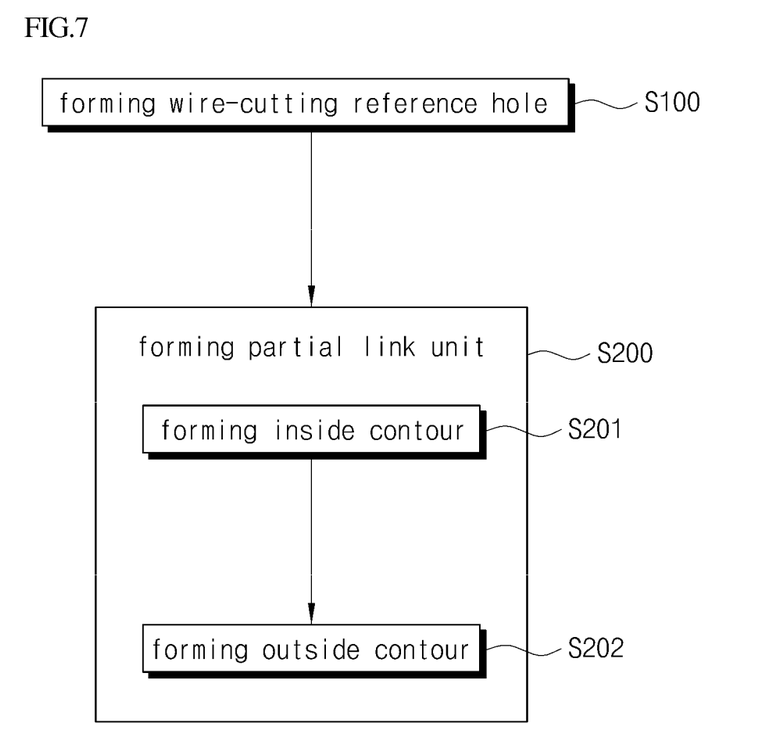
FIG. 7 is a flowchart of the method of manufacturing the master link according to the present invention.

As shown in FIG. 7, the method of manufacturing the master link according to the present invention includes a wire-cutting-reference-hole forming step S100 of forming a wire-cutting reference hole 41, into which a wire (not shown) is inserted, at a predetermined position in the master link 10, and a partial-link-unit forming step S200 of inserting the wire into the wire-cutting reference hole 41 and forming the first and second assembly portions 31 and 32 of the first and second partial link units 21 and 22 by wire-cutting.

At the wire-cutting-reference-hole forming step S100, after the outline of the master link 10 has been completely formed, the wire-cutting reference hole 41 is formed in the master link 10 at a position between the first and second partial link units 21 and 22, particularly, at a position corresponding to a gap between the first assembly portion 31 and the second assembly portion 32. Preferably, the wire-cutting reference hole 41 is formed by super-drilling, and the diameter thereof has a size appropriate for the wire (not shown) to be inserted into the wire-cutting reference hole 41. For instance, if the diameter of the wire is 0.65 mm, the wire-cutting reference hole 41 is preferably formed such that the diameter thereof becomes 0.8 mm to facilitate the insertion of the wire.

Figure 3:
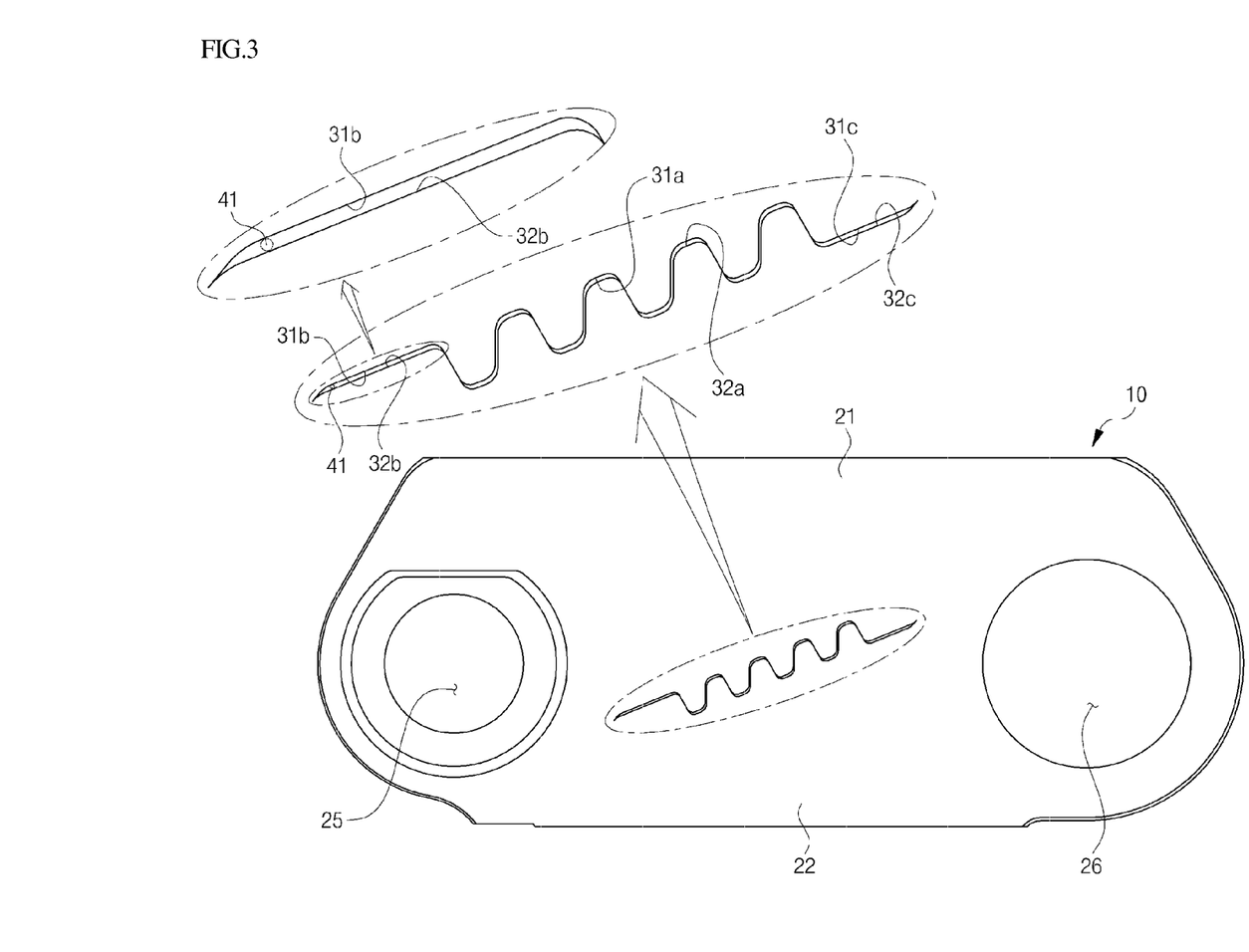
FIG. 3 is a view illustrating an operation of forming a wire-cutting reference hole and teeth-shaped portions of the partial link units in a method of manufacturing the master link according to the present invention.

As shown in FIG. 3, the wire-cutting reference hole 41 may be formed at a position corresponding to a gap between the front inclined connection portion 31b of the first assembly portion 31 and the front inclined connection portion 32b of the second assembly portion 32. Subsequently, the wire is inserted into the wire-cutting reference hole 41, and then the wire-cutting process is conducted, thereby forming the front inclined connection portions 31b and 32b, the teeth-shaped portions 31a and 32a, and the rear inclined connection portions 31c and 32c of the first and second assembly portions 31 and 32 in succession.

Alternatively, the wire-cutting reference hole 41 may be formed at a position corresponding to a gap between the rear inclined connection portion 31c of the first assembly portion 31 and the rear inclined connection portion 32c of the second assembly portion 32. As a further alternative, the wire-cutting reference hole 41 may be formed at a position corresponding to a gap between the teeth-shaped portion 31a of the first assembly portion 31 and the teeth-shaped portion 32a of the second assembly portion 32.

The partial-link-unit forming step S200 includes an inside contour forming step S201 in which the inside contours of the first and second assembly portions 31 and 32 are formed based on the wire-cutting reference hole 41, and an outside contour forming step S202 in which the outside contours of the first and second assembly portions 31a and 32 are formed.

At the inside contour forming step S201, the teeth-shaped portions 31a and 32a of the first and second assembly portions 31 and 32 are formed based on the wire-cutting reference hole 41 by wire-cutting. Particularly, as shown in FIG. 3, after the wire is inserted into the wire-cutting reference hole 41, the inside contours of the first and second assembly portions 31 and 32, that is, the front inclined connection portions 31*b* and 32*b*, the teeth-shaped portions 31*a* and 32*a* and the rear inclined connection portions 31*c* and 32*c*, are formed.

Figure 4:
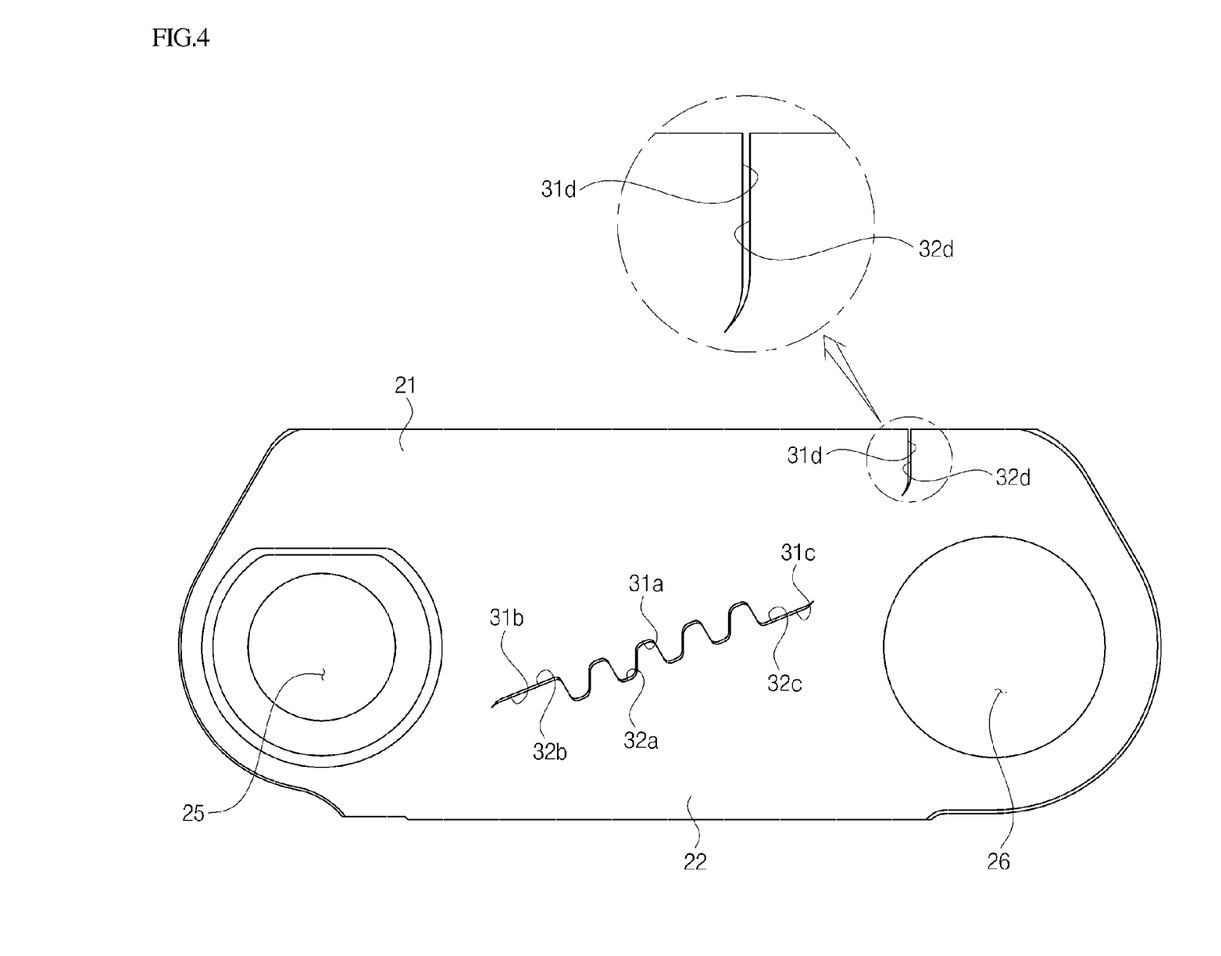
FIG. 4 is a view illustrating an operation of forming vertical portions of the partial link units in the method of manufacturing the master link according to the present invention.
Figure 5:
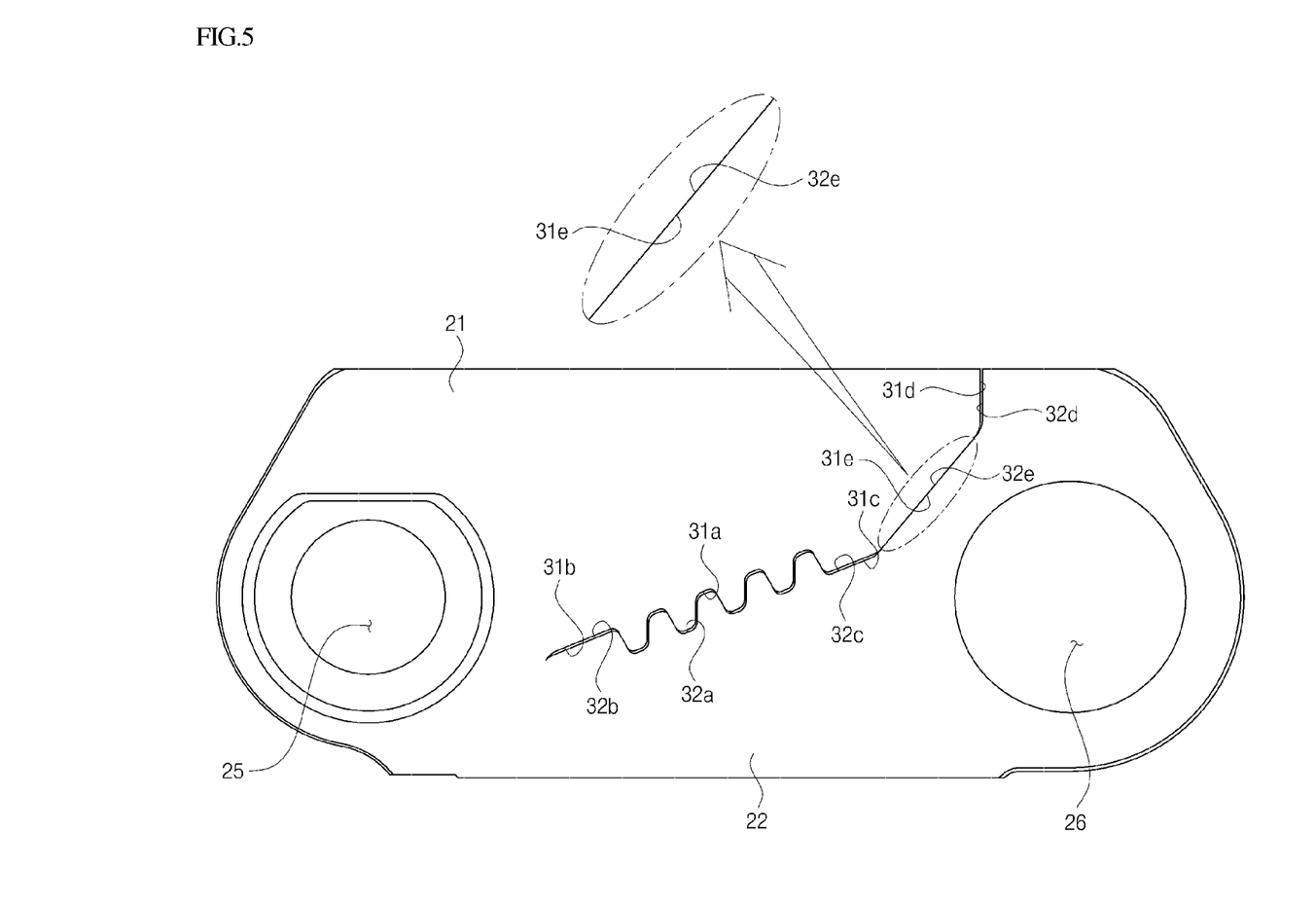
FIG. 5 is a view illustrating an operation of forming rear inclined portions of the partial link units in the method of manufacturing the master link according to the present invention.
Figure 6:
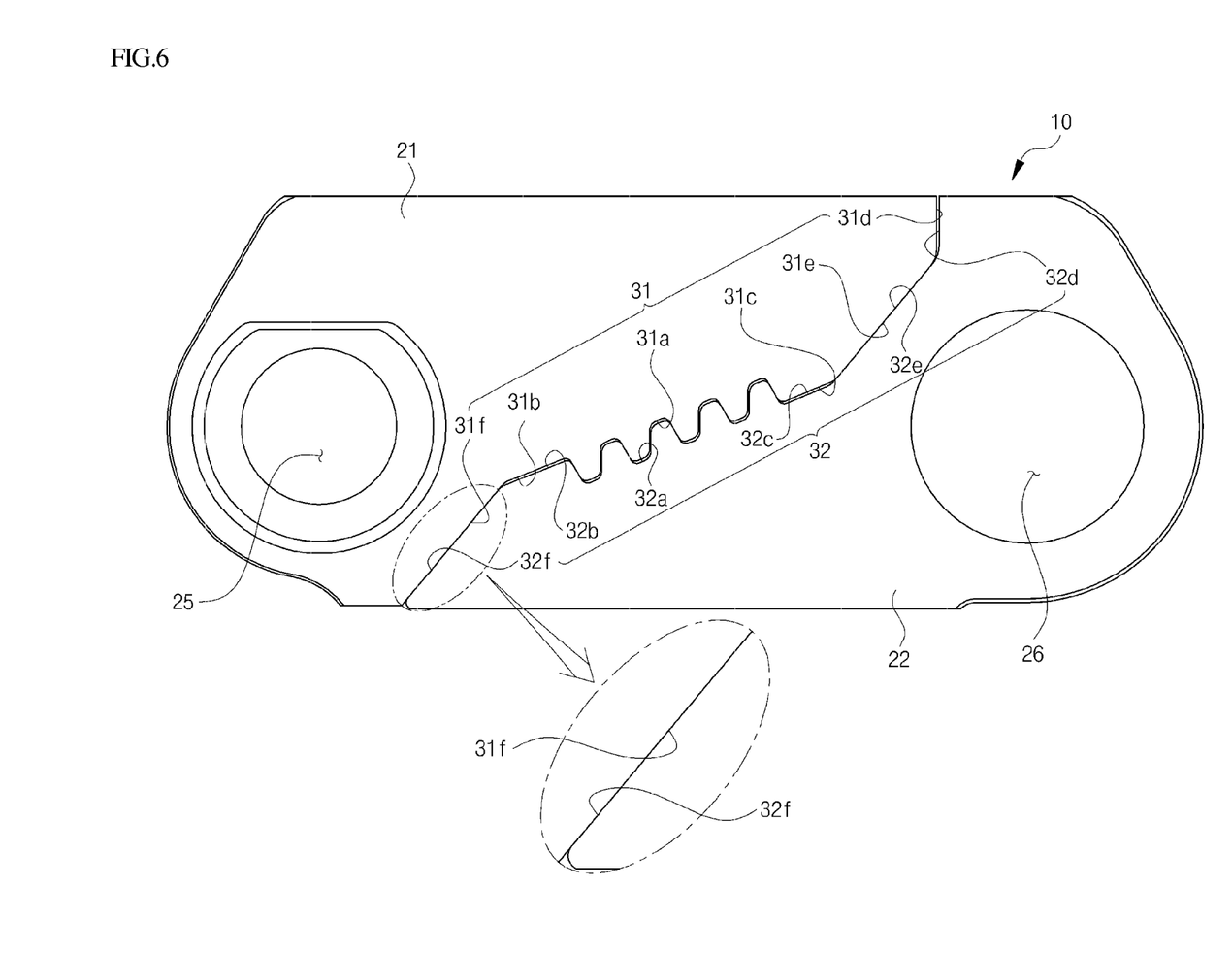
FIG. 6 is a view illustrating an operation of forming front inclined portions of the partial link units in the method of manufacturing the master link according to the present invention.

At the outside contour forming step S202, as shown in FIG. 4, the vertical portions 31*d* and 32*d* of the first and second assembly portions 31 and 32 are formed by wire-cutting. Subsequently, as shown in FIG. 5, the rear inclined surfaces 31*e* and 32*e* are formed, thus connecting lower ends of the vertical portions 31*d* and 32*d* to the respective rear inclined connection portions 31*c* and 32*c*. As shown in FIG. 6, the front inclined surfaces 31*f* and 32*f* are formed by wire-cutting such that the front inclined surfaces 31*f* and 32*f* are connected to the respective front inclined connection portions 31*b* and 32*b* of the teeth-shaped portions 31*a* and 32*a*. Ultimately, the master link 10 is divided into the first partial link unit 21 and the second partial link unit 22 by the first and second assembly portions 31*a* and 32.

As described above, in the present invention, after forming the wire-cutting reference hole 41 at a predetermined position in the master link 10, wire-cutting is conducted based on the wire-cutting reference hole 41 so that the first and second assembly portions 31*a* and 32 of the first and second partial link units 21 and 22 can be more precisely and smoothly formed.

Furthermore, in the present invention, because the wire-cutting is conducted based on the wire-cutting reference hole 41, the operation of forming the inside contour portions (the teeth-shaped portions 31*a* and 32*a*, the front inclined connection portions 31*b* and 32*b*, the rear inclined connection portions 31*c* and 32*c*, etc.) precedes the operation of forming the outside contour portions (the vertical portions 31*d* and 32*d*, the rear inclined surfaces 31*e* and 32*e*, the front inclined surfaces 31*f* and 32*f*, etc.). Thereby, the cutting error in forming the assembly portions of the partial link units can be markedly reduced, thus enhancing the degree of precision and the quality of the product.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a master link divided into a first partial link unit having a first assembly portion and a second partial link unit having a second assembly portion, the method comprising:

forming a wire-cutting reference hole at a predetermined position in the master link so that a wire is inserted into the wire-cutting reference hole; and forming the first and second partial link units by wire-cutting after inserting the wire into the wire-cutting reference hole, wherein the forming of the first and second partial link units comprises:

forming inside contours of the first and second assembly portions based on the wire-cutting reference hole; and forming outside contours of the first and second assembly portions.

2. The method as set forth in claim 1, wherein the forming of the wire-cutting reference hole comprises forming the wire-cutting reference hole at a predetermined position between the first and second partial link units, wherein the wire-cutting reference hole is formed by a super drilling process.

3. The method as set forth in claim 1, wherein each of the first and second assembly portions comprises a teeth-shaped portion, a front inclined surface formed ahead of the teeth-shaped portion, the front inclined surface being inclined at a predetermined angle, a rear inclined surface formed behind the teeth-shaped portion, the rear inclined surface being inclined at a predetermined angle, and a vertical portion extending upwards from the rear inclined surface, the forming of the inside contours comprises forming the teeth-shaped portions of the first and second assembly portions based on the wire-cutting reference hole by wire-cutting, and the forming of the outside contours comprises forming the vertical portions, the rear inclined surfaces and the front inclined surfaces of the first and second assembly portions.

4. The method as set forth in claim 1, wherein the forming of the inside contours comprises forming front inclined connection portions, teeth-shaped portions, rear inclined connection portions of the first and second assembly portions, and the forming of the outside contours comprises forming vertical portions of the first and second assembly portions by wire-cutting and then forming rear inclined surfaces such that lower ends of the vertical portions are connected to the respective rear inclined connections of the teeth-shaped portions; and forming the front inclined surfaces by wire-cutting such that the front inclined surfaces are connected to the respective front inclined connection portions of the teeth-shaped portions.

\* \* \* \* \*